United States Patent
Johnson

[19]

[11] Patent Number: 6,125,575
[45] Date of Patent: Oct. 3, 2000

[54] FISHING GEAR CADDY

[76] Inventor: Russell L. Johnson, 8503 NW. Winter Ave., Kansas City, Mo. 64153

[21] Appl. No.: 09/390,753

[22] Filed: Sep. 7, 1999

[51] Int. Cl.⁷ .................................................. A01K 97/00
[52] U.S. Cl. .......................... 43/54.1; 43/57.1; 242/594.5
[58] Field of Search ..................... 43/54.1, 57.1, 43/57.2; 206/315.11; 224/920; 114/190; 248/309.2, 316.8; 211/7, 123, 124; 242/594.5, 594.6, 588.1; 294/137, 158, 161, 162, 163

[56] References Cited

U.S. PATENT DOCUMENTS

| | | |
|---|---|---|
| 244,017 | 7/1881 | Zeigler . |
| 1,586,058 | 5/1926 | Winfield . |
| 1,593,974 | 7/1926 | Juvinall . |
| 1,820,497 | 8/1931 | Rose . |
| 2,398,896 | 4/1946 | Simmons . |
| 2,591,694 | 4/1952 | Gilbert . |
| 3,678,611 | 7/1972 | Files .............................................. 43/26 |
| 4,366,641 | 1/1983 | Price ........................................ 43/54.5 |
| 4,691,469 | 9/1987 | Alsobrook et al. ...................... 43/54.1 |
| 4,884,360 | 12/1989 | Pearcy ...................................... 43/54.1 |
| 5,402,596 | 4/1995 | Gillming, Jr. ............................ 43/54.1 |
| 5,967,315 | 10/1999 | Langtry, II ........................ 206/315.11 |

*Primary Examiner*—Jack W. Lavinder
*Attorney, Agent, or Firm*—Henderson & Sturm LLP

[57] ABSTRACT

A caddy for carrying a plurality of flotation devices. The caddy includes a frame having first and second end members, each having a slot formed therein for receiving a shoulder strap. The first end member further includes a pair of apertures for receiving a pair of elongated aluminum bars onto which a number of bulky flotation devices are secured. The first end member also includes a spring biased locking device which is coupled to the distal end of each bar.

6 Claims, 1 Drawing Sheet

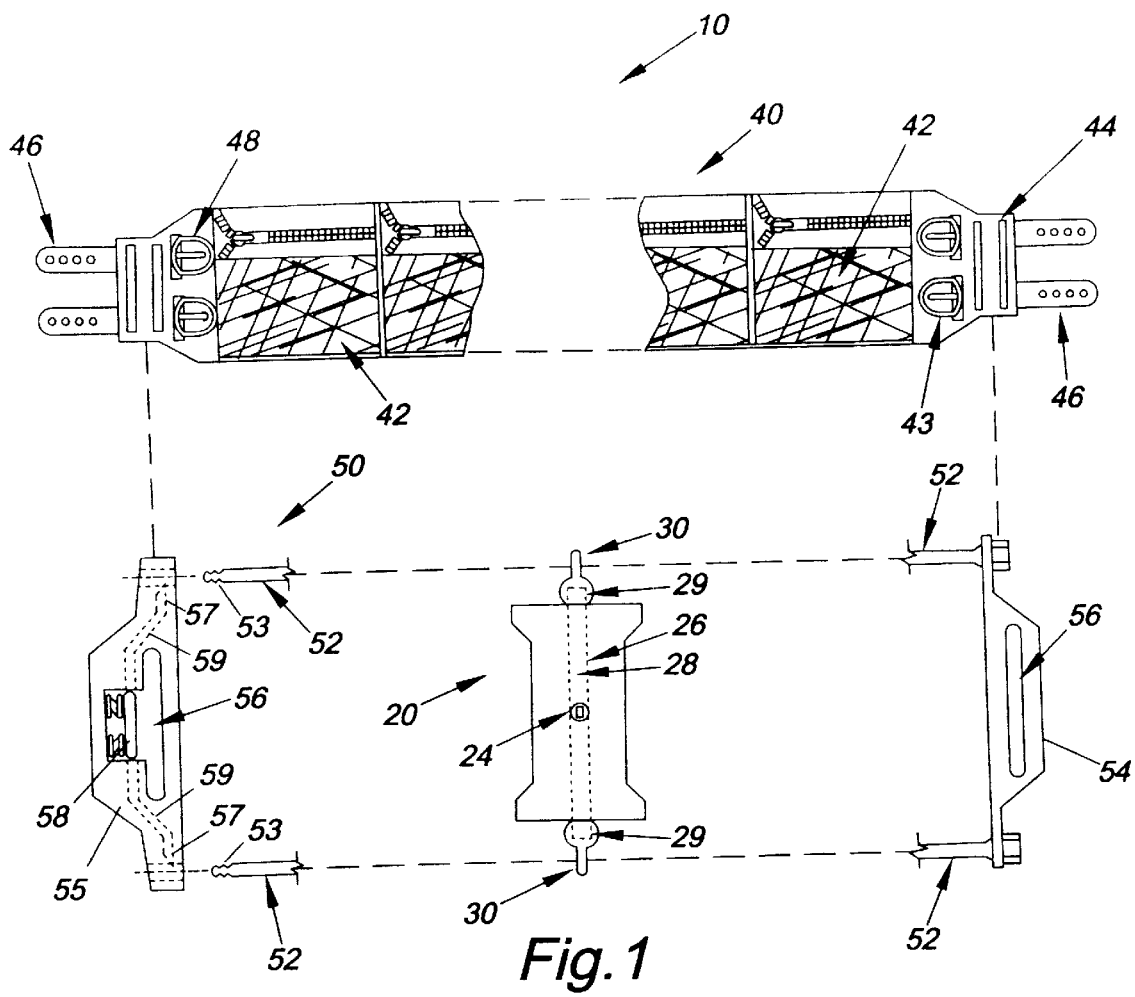
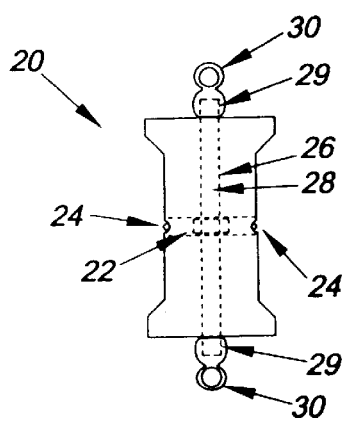
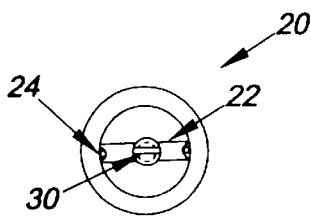
Fig. 1
Fig. 2
Fig. 3

FISHING GEAR CADDY

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to the field of fishing accessories, and more particularly to a caddy for bulky fishing gear.

2. Description of the Related Art

As can be seen by reference to the following U.S. Pat. Nos. 1,586,058; 1,593,974; 3,678,611; 4,691,469; 4,884,360; and 5,402,596 the prior art is replete with myriad and diverse fishing accessories.

While all of the aforementioned prior art constructions are more than adequate for the basic purpose for which they have been specifically designed, they are uniformly deficient with respect to their failure to provide a simple, efficient and practical caddy for bulky fishing gear.

As a consequence of the foregoing situation, there has existed a need for a new and improved fishing gear caddy and the provision of such a construction is a stated objective of the present invention.

BRIEF SUMMARY OF THE INVENTION

Briefly stated, the present invention provides a caddy for carrying a plurality of flotation devices. The caddy includes a frame having first and second end members, each having a slot formed therein for receiving a shoulder strap. The first end member further includes a pair of apertures for receiving a pair of elongated aluminum bars onto which a number of bulky flotation devices are secured. The first end member also includes a spring biased locking device which is coupled to the distal end of each bar.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a cut away top plan view showing the frame, the shoulder strap, and one of the plurality of floats secured on the frame of the fishing gear caddy of the present invention;

FIG. 2 is a side elevational view of the float; and

FIG. 3 is an end elevational view of the float.

DETAILED DESCRIPTION OF THE INVENTION

As can be seen by reference to the drawings, and in particulary to FIG. 1, the fishing gear caddy forms the basis of the present invention is designated generally by reference number (10). The caddy (10) allows one to easily carry a number of buoyancy floats or jugs (20) used for catfishing by means of a shoulder strap (40) and a specially designed frame (50) with a quick release handle (55). The jugs (20) are pre-rigged with line and the shoulder strap (40) features built-in storage pockets (42) for miscellaneous items such as bungee cords, plastic line, fishing tackle, and other items of fishing gear. The caddy (10) allows one to easily carry catfish lines to the fishing hole with everything pre-rigged and ready to go. The caddy (10) is designed to carry six buoyancy jugs (20) or five buoyancy jugs (20) and one bait can or container. The lines attached to the jugs (20) could be color-coded to indicate different lengths.

The caddy (10) is comprised of several interrelated components, including the frame (50) with a quick release handle (55), a shoulder strap (40) with a number of zippered web storage pockets (42), and six hard foam rubber flotation jugs (20). The shoulder strap (40) is approximately 6" wide and 46" long and features Velcro strips (44) and belts (46) and buckles (48) at each of the ends for quick connection and disconnection of the ends of the strap (40). The design of the web pockets (42) allows the user to be able to see the items stored inside, for added convenience. The frame (50) has two 36" long aluminum bars or rods (52) spaced 12" apart, attached to a plastic end member (54). The end member (54) has a slot (56) allowing the device to be attached to the belt (46) and buckle (48) of the shoulder strap (40). A plastic quick release handle (55) slips onto the ends of the parallel aluminum bars (52) and secures by means of grooves (53) in the bars (52) and two sliding detents (57) in the ends of the handle (55). The design of the handle (55) allows the detents (57) to be retracted by means of a spring loaded release bar (58) in the center of the assembly. The detents (57) are at the ends of two flexible wires (59), and they are connected to the release bar (58) so that when pulled up, the flexible wires (59) slide toward the center, effectively retracting the detents (57). The flotation jugs (20) are shaped in the manner of a spindle with the ends being larger in diameter than the center area, allowing line to be rolled onto the jug (20) without danger of slipping off the ends. A plastic shaft (22) with a centered ½" diameter hole is inserted radially through the center of the jug (20) to attach the fishing line. A hard plastic tube (26) runs axially through the jug (20) from one end to the other, passing through the hole in the radially directed plastic shaft (22). Adhesive is applied to secure the tube (26) to the shaft (22). A length of aluminum rod (28) with threaded ends (29) runs through the tube (26), and an eyelet (30) is attached to each end so as to secure the rod (28) onto the jug (20) while allowing the cylinder to spin freely. As an option, the caddy (10) could be designed to carry five flotation jugs (20) and one bait can or container. The lines attached to the center eyelet (24) of each jug (20) could also be color-coded in the event that the user desires some to be of different lengths than others. In addition, the line used to connect two floating jugs (20) together could have eyelets attached every 3 or 4 feet, if desiring to rig a trout line.

In use, the user simply rigs the jugs (20) with line snap hooks, and weights. The line would be attached to one of the eyelets (24) at the ends of the radial shaft (22). The line would be rolled onto the cylinder of the jugs (20) and the assembly slipped onto the parallel aluminum bars (52). When all six pre-rigged jugs (20) are in place, the handle (55) would be snapped onto bars (52), being held in place by the spring loaded detents (57) which would catch in the grooves (53) at the end of each bar (52). Miscellaneous items such as bungee cord, plastic line and fishing tackle would be placed into the zippered web storage pockets (42) in the shoulder strap (40). The user would then enjoy the benefit of being able to easily carry the caddy (10) to their fishing hole by simply connecting the shoulder strap (40), and slipping the assembly onto their shoulder. Once at the fishing area, the quick release handle (55) would be removed, the jugs (20) pulled off the bars (52), and the line unrolled for use. The floating jugs (20) would be connected together with line or bungee cords, and the user would be free to leave them until such time as retrieval is desired. When finished fishing, the user would pull the jugs (20) out of the water, slip them onto the aluminum rods (52), and snap the quick release handle (55) onto the ends of the bars (52). The jugs (20) could then be spun so as to roll the line onto the spindle, and the entire assembly easily transported back to the vehicle. Use of the caddy (10) would provide a very practical and easy to use method of allowing one to more easily carry required bulky buoyancy jugs (20) along when catfishing.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

I claim:

1. A fishing gear caddy, comprising:
   a frame including a pair of opposing end members interconnected by a pair of spaced elongated rods; and
   a plurality of buoyancy floats, each float being rotatably mounted on an axially disposed shaft, the shaft having ends extending out from the float and eyelets attached to the ends, the eyelets being disposed to be removably received on the spaced rods intermediate the end members.

2. The caddy of claim 1 wherein each of the spaced rods includes a grooved end, and wherein one of the pair of frame end members includes a spring biased quick release handle having detents disposed to selectively engage the grooved ends of the spaced rods.

3. The caddy of claim 1 further including an elongated shoulder strap having opposing ends carrying fasteners adapted to be attached to the frame end members.

4. The caddy of claim 3 wherein each frame end member includes a slot for receiving the shoulder strap fasteners.

5. The caddy of claim 3 wherein shoulder strap carries a plurality of web pockets.

6. The caddy of claim 1 wherein each of the buoyancy floats includes a loop, whereby fishing line may be conveniently attached to the floats.

\* \* \* \* \*